Figure 1:
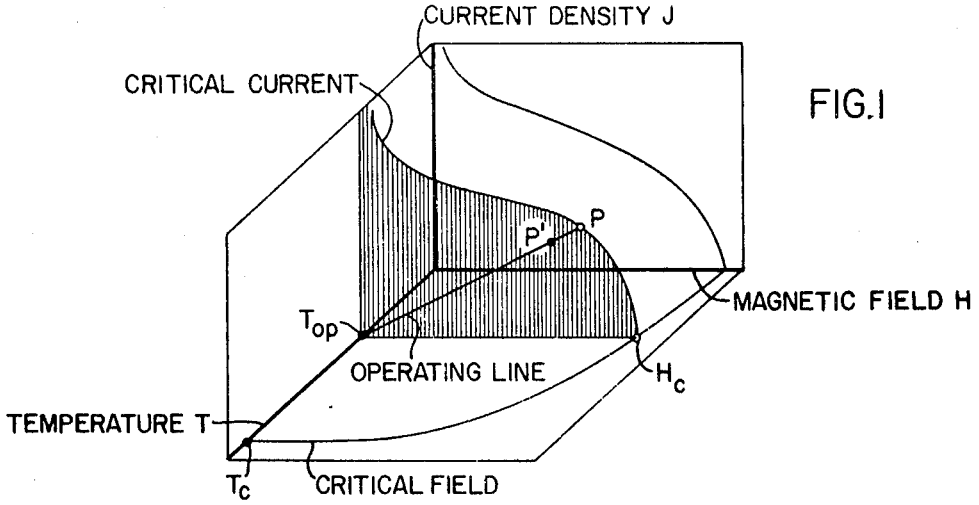
Figure 2:
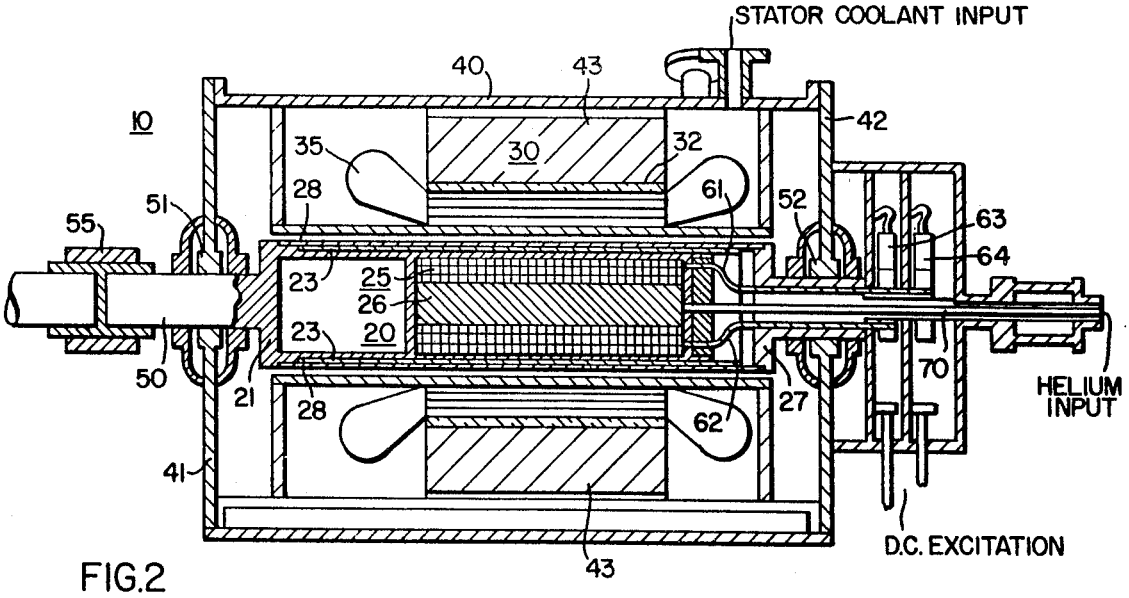
Figure 3:
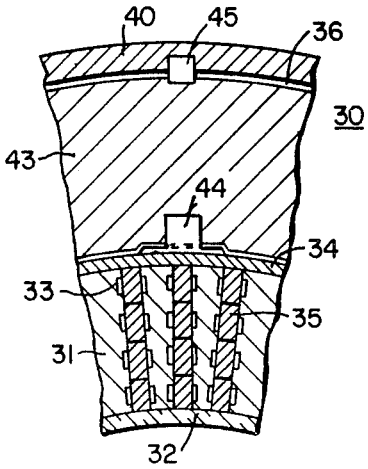
Figure 8:
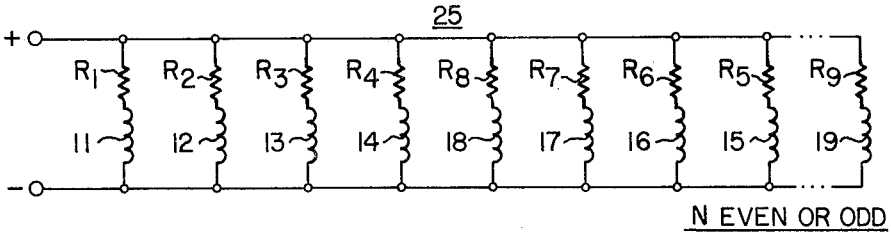
Figure 9:
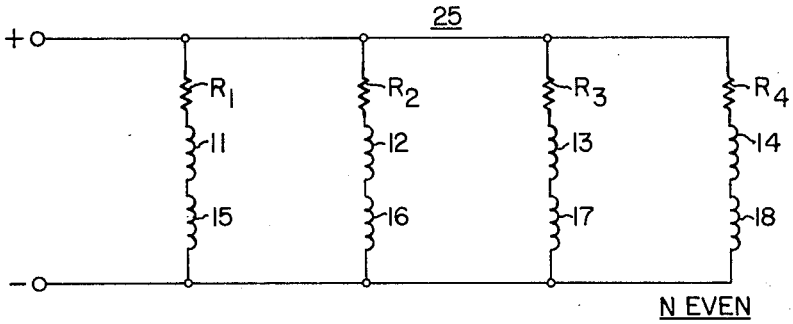
Figure 10:
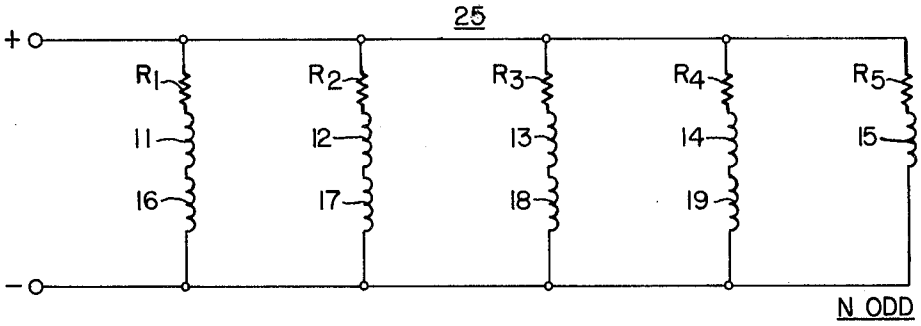
Figure 11:
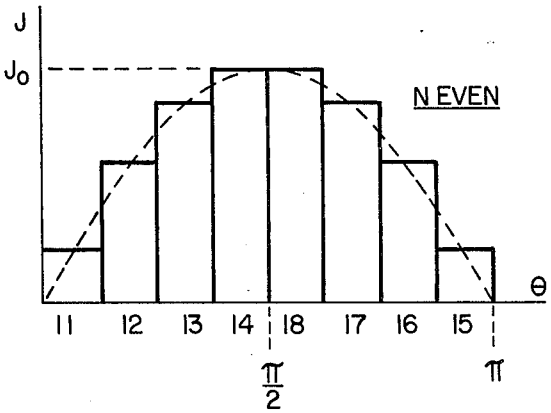
Figure 12:
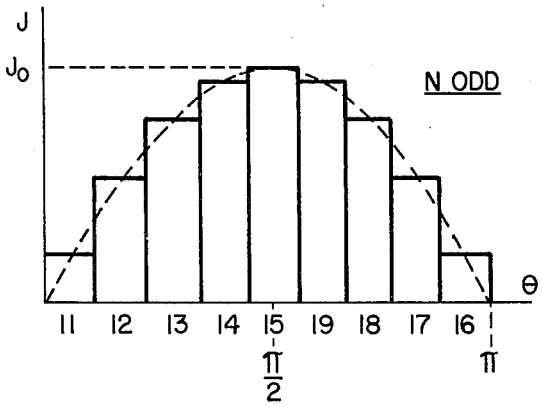

DEFENSIVE PUBLICATION

UNITED STATES PATENT AND TRADEMARK OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent and Trademark Office makes no assertion as to the novelty of the disclosed subject matter.

PUBLISHED APRIL 6, 1976

945 O.G. 29

T945,003

SUPERCONDUCTIVE WINDING FOR AN IRON CORE ROTOR OF A DYNAMOELECTRIC MACHINE

Walter J. Carr, Jr., Pittsburgh, Pa., assignor to Westinghouse Electric Corporation, Pittsburgh, Pa.

Filed Jan. 2, 1975, Ser. No. 538,290
**Int. Cl. H02k *9/00***
U.S. Cl. 310—40
3 Sheets Drawing. 23 Pages Specification

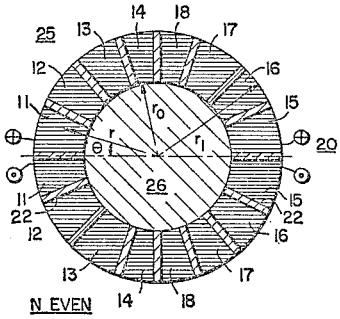

Iron or other ferromagnetic material is utilized in the rotor core of a dynamoelectric machine having a superconductive field winding. A parallel connection arrangement of the winding in combination with a plurality of current dividing resistance elements provides a sinusoidal distribution of current density across the circumference of the rotor. The magnetic field associated with the sinusoidal current distribution is reduced in critical interior regions of the winding by the demagnetizing field produced by the magnetic poles of the ferromagnetic core, thereby allowing a larger current to flow in the winding without destroying superconductivity. The two fields add in regions exterior to the winding, thereby providing a net increase in the useful external field obtained from a given amount of superconductive material.

SUPERCONDUCTIVE WINDING FOR AN IRON CORE ROTOR OF A DYNAMOELECTRIC MACHINE

Original Filed Jan. 2, 1975

FIG.4
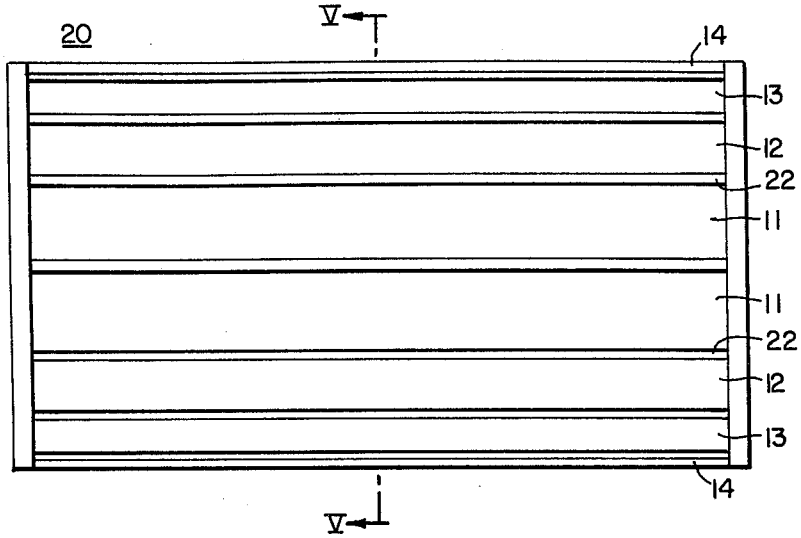
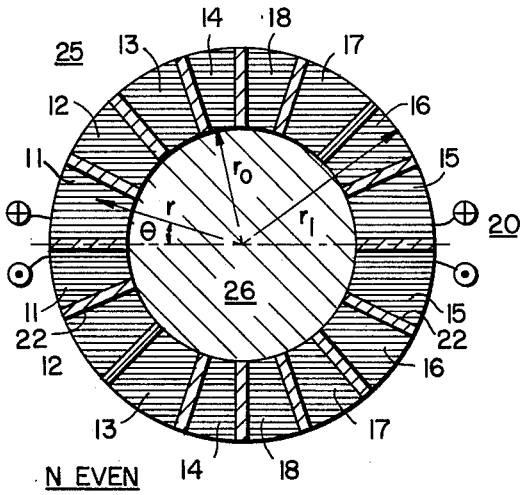
FIG.5
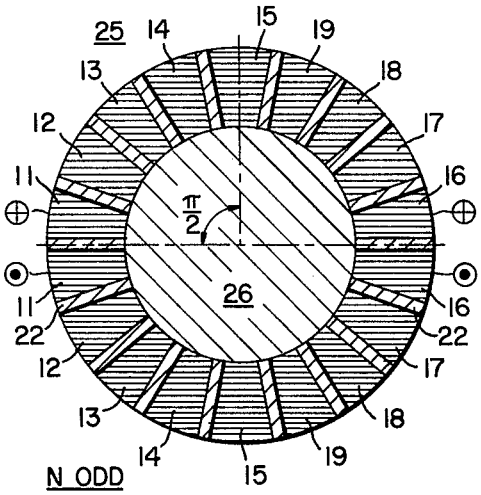
FIG.6
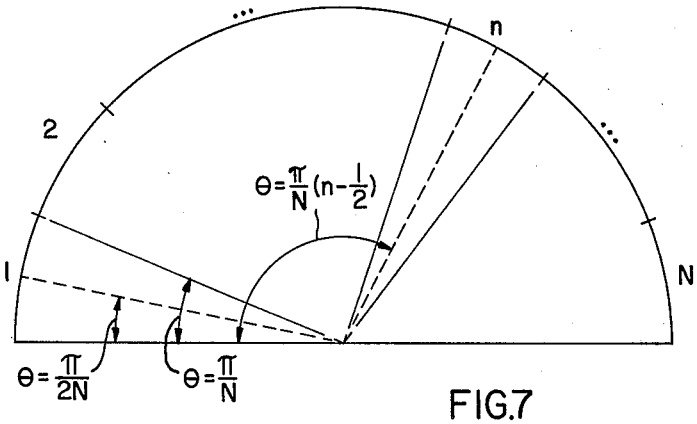
FIG.7